(12) United States Patent
Yoshioka et al.

(10) Patent No.: US 7,591,354 B2
(45) Date of Patent: Sep. 22, 2009

(54) SHOCK ABSORBING STEERING DEVICE FOR VEHICLE

(75) Inventors: Koji Yoshioka, Kobe (JP); Hideo Matsubara, Nara (JP); Kazuhiro Watanabe, Yamatokoriyama (JP)

(73) Assignee: Jtekt Corporation, Osaka (JP)

( * ) Notice: Subject to any disclaimer, the term of this patent is extended or adjusted under 35 U.S.C. 154(b) by 0 days.

(21) Appl. No.: 12/216,037

(22) Filed: Jun. 27, 2008

(65) Prior Publication Data

US 2009/0001640 A1    Jan. 1, 2009

(30) Foreign Application Priority Data

Jun. 29, 2007    (JP) .............. 2007-172279

(51) Int. Cl.
    *B62D 1/19*    (2006.01)
(52) U.S. Cl. .............. 188/377; 280/777; 464/183
(58) Field of Classification Search ............ 188/371, 188/376, 377; 280/777; 74/492–496; 464/183
    See application file for complete search history.

(56) References Cited

U.S. PATENT DOCUMENTS

| 3,434,367 | A | * | 3/1969 | Renneker et al. .............. 74/492 |
| 3,747,367 | A | * | 7/1973 | Muller .......................... 464/79 |
| 4,531,619 | A | * | 7/1985 | Eckels .......................... 188/371 |
| 5,503,431 | A | * | 4/1996 | Yamamoto ................... 280/777 |
| 6,022,047 | A | * | 2/2000 | Okubo .......................... 280/777 |
| 6,328,656 | B1 | * | 12/2001 | Uchikawa et al. ........... 464/183 |

FOREIGN PATENT DOCUMENTS

JP    63-101168    5/1988

* cited by examiner

*Primary Examiner*—Christopher P Schwartz
(74) *Attorney, Agent, or Firm*—Rabin & Berdo, PC (57) ABSTRACT

A shock absorbing steering device for vehicle includes an intermediate shaft that couples a steering shaft and a steering gear. The intermediate shaft includes a hollow accordion portion allowed to undergo plastic deformation. The accordion portion has plural pairs of crest portions and trough portions disposed alternately in an axial direction. At least in a part of the accordion portion in the axial direction, a depth from apexes of the crest portions to bottoms of the trough portions includes a first depth corresponding to a part of the accordion portion in a circumferential direction and a second depth corresponding to a rest part of the accordion portion in the circumferential direction. The first depth and the second depth are different from each other.

8 Claims, 8 Drawing Sheets

SHOCK ABSORBING STEERING DEVICE FOR VEHICLE

BACKGROUND OF THE INVENTION

1. Field of the Invention

The present invention relates to a shock absorbing steering device for a vehicle.

2. Description of Related Arts

In a shock absorbing steering device for a vehicle, a steering wheel is connected to the input shaft of a steering gear via a steering shaft, a first universal joint, an intermediate shaft, and a second universal joint. The intermediate shaft has a hollow accordion portion (see, for example, JP-A-63-101168). At a primary crash of the vehicle, an impulsive force is mitigated as the accordion portion undergoes compressive deformation.

It has been required to ensure a large amount of relative movement at a pair of the end portions of the intermediate shaft (corresponding to a shock absorbing stroke amount) upon a crash.

SUMMARY OF THE INVENTION

An object of the invention is to provide a shock absorbing steering device for vehicle having a large shock absorbing stroke amount.

In order to achieve the above and other objects, a shock absorbing steering device for vehicle according to a preferred embodiment of the invention includes: a steering shaft coupled to a steering member; a steering gear for turning a steerable wheel; and an intermediate shaft interposed between the steering shaft and the steering gear to couple the steering shaft and the steering gear. The intermediate shaft includes a hollow accordion portion allowed to undergo plastic deformation. The accordion portion has plural pairs of crest portions and trough portions disposed alternately in an axial direction of the accordion portion. At least in a part of the accordion portion in the axial direction, a depth from apexes of the crest portions to bottoms of the trough portions includes a first depth corresponding to a part of the accordion portion in a circumferential direction and a second depth corresponding to a rest part of the accordion portion in the circumferential direction. The first depth and the second depth are different from each other.

Upon a crash of the vehicle, the steering gear moves with respect to the vehicle body toward the back of the vehicle. In association with this movement, the accordion portion contracts in the axial direction of the intermediate shaft. In this instance, a contraction amount in the part of the accordion portion in the circumferential direction and a contraction amount in the rest part are different from each other. The intermediate shaft consequently contracts owing to the accordion portion that contracts while it is bending. Hence, in comparison with a conventional case where the intermediate shaft directly contracts without causing the accordion portion to bend, it is possible to achieve a large shock absorbing stroke amount.

DETAILED DESCRIPTION OF THE PREFERRED EMBODIMENTS

Figure 1A:
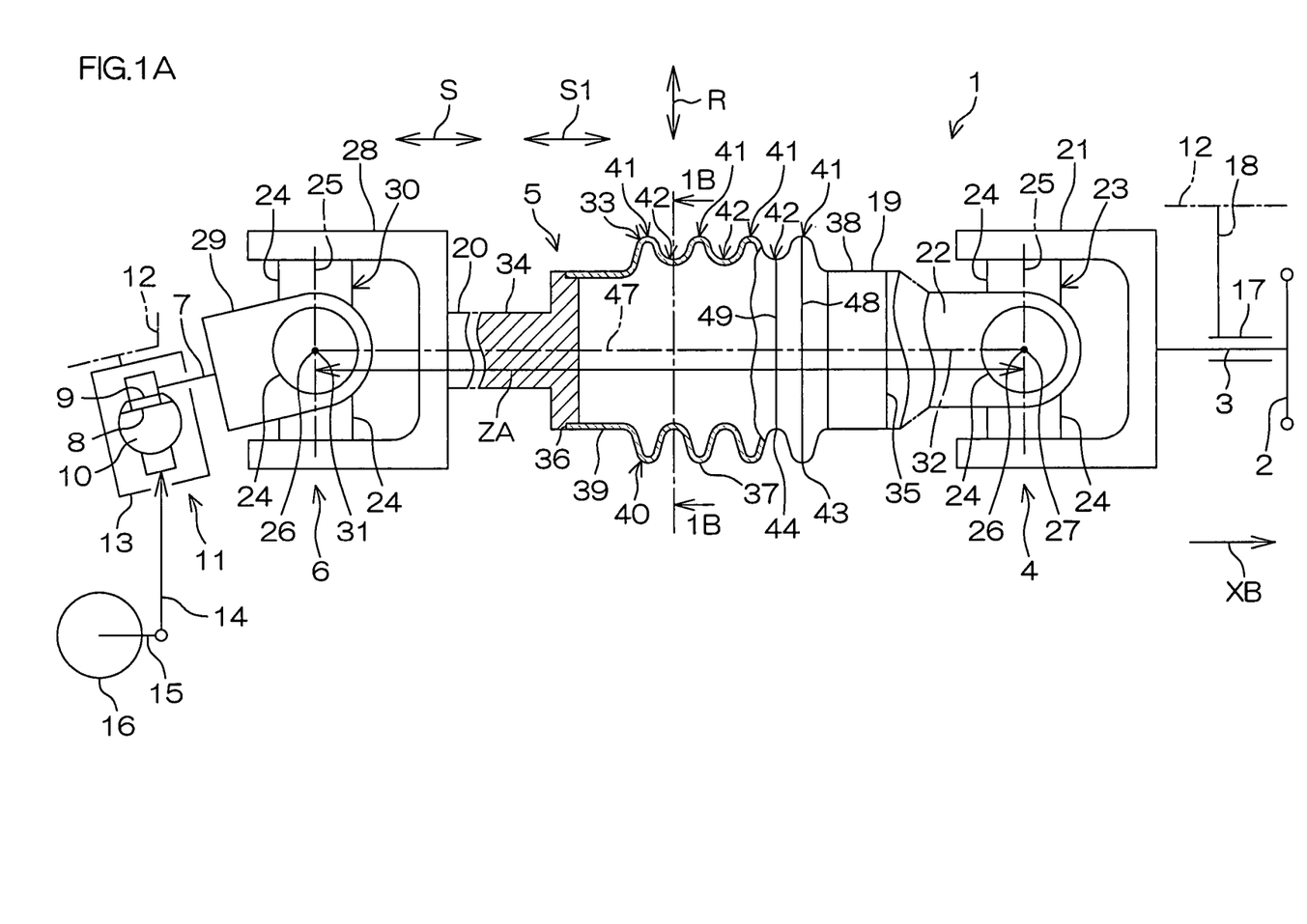
FIG. 1A is a partial broken side view schematically showing the configuration of a shock absorbing steering device for vehicle according to one embodiment of the invention.
Figure 1B:
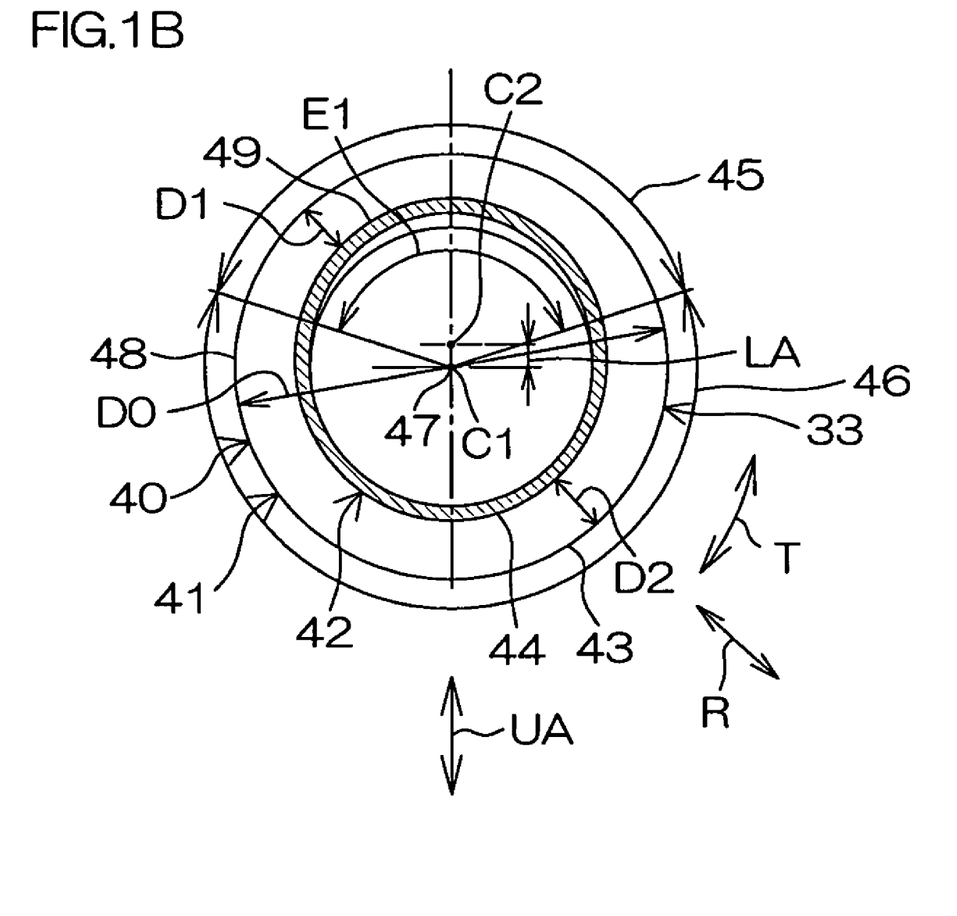
FIG. 1B is a cross section taken on line 1B-1B of FIG. 1A.

Preferred embodiments of the invention will be described with reference to the accompanying drawings. FIG. 1A is a partial broken schematic view of a shock absorbing steering device for vehicle according to one embodiment of the invention. FIG. 1B is a cross section taken on line 1B-1B of FIG. 1A.

Referring to FIG. 1A, a shock absorbing steering device 1 for vehicle includes a steering shaft 3 coupled to a steering member 2, such as a steering wheel, and an intermediate shaft 5 coupled to the steering shaft 3 via a first universal joint 4. The shock absorbing steering device 1 for vehicle also includes a pinion shaft 7 coupled to the intermediate shaft 5 via a second universal joint 6 and a rack bar 10 as a turning shaft having rack teeth 9 meshed with pinion teeth 8 provided in the vicinity of an end portion of the pinion shaft 7 and extending in the right-left direction of an automobile.

A steering gear 11 is formed of a rack and pinion mechanism with the pinion shaft 7 and the rack bar 10. In short, the steering gear 11 has the pinion shaft 7 described above as the input shaft into which rotational motions of the steering member 2 are inputted. The rack bar 10 is supported inside a housing 13 fixed to a vehicle body 12 via unillustrated plural bearings so as to be free to reciprocate linearly. A pair of tie rods 14 is connected to a pair of the end portions of the rack bar 10 in a one-to-one correspondence. Each tie rod 14 is coupled to a corresponding steerable wheel 16 via a corresponding knuckle arm 15.

When the steering shaft 3 rotates as the steering member 2 is operated, the rotations are converted to linear motions of the rack bar 10 along the right-left direction of the automobile by the pinion teeth 8 and the rack teeth 9. The steerable wheels 16 are thus turned.

In addition, the shock absorbing steering device 1 for vehicle has a steering column 17 holding the steering shaft 3 in a rotatable manner and integrally in the axial direction of the steering shaft 3, and a supporting member 18 supporting the steering column 17 on the vehicle body 12. The supporting member 18 restricts the steering column 17 and the steering shaft 3 from moving with respect to the vehicle body 12 toward the back of the vehicle, XB, upon a crash of the vehicle. The axial direction S of the intermediate shaft 5 is disposed almost horizontally so as to go along the front-back direction of the vehicle.

The intermediate shaft 5 has a first end portion 19 and a second end portion 20 with respect to the axial direction S of the intermediate shaft 5. The first end portion 19 of the intermediate shaft 5 is coupled to the end portion of the steering shaft 3 via the first universal joint 4. The second end portion 20 of the intermediate shaft 5 is coupled to the pinion shaft 7 of the steering gear 11 via the second universal joint 6.

The intermediate shaft 5 transmits torque transmitted from the steering shaft 3 further to the pinion shaft 7 of the steering gear 11. Also, the intermediate shaft 5 is configured so as to contract while it is bending when absorbing a shock (see FIG. 4A, FIG. 4B, and FIG. 4C). Hereinafter, descriptions will be given for a normal state before a shock is absorbed unless specified otherwise.

The first universal joint 4 has a first yoke 21 provided to the end portion of the steering shaft 3, a second yoke 22 provided to the first end portion 19 of the intermediate shaft 5, and a joint cross 23 coupling the first and second yokes 21 and 22.

The joint cross 23 has turnnions 24 (shown only in part) as four axis portions. The four turnnions 24 are disposed on first and second center axes 25 and 26 orthogonal to each other in the shape of a cross. Of the four turnnions 24, two turnnions 24 extend in directions opposite to each other along the first center axis 25 and they are supported on the first yoke 21 in a rotatable manner. The other two turnnions 24 extend in directions opposite to each other along the second center axis 26, which extends in a direction orthogonal to the sheet surface of FIG. 1A, and they are supported on the second yoke 22 in a rotatable manner. The intersection of the first and second center axes 25 and 26 of the joint cross 23 is the joint center 27 of the first universal joint 4.

Because the first and second universal joints 4 and 6 are of the same configuration, the second universal joint 6 will be described chiefly regarding differences from the first universal joint 4.

The second universal joint 6 has a first yoke 28 provided to the second end portion 20 of the intermediate shaft 5, a second yoke 29 provided to the end portion of the pinion shaft 7, and a joint cross 30 coupling the first and second yokes 28 and 29. The components of the joint cross 30 of the second universal joint 6 will be labeled with the same reference numerals with respect to the joint cross 23 of the first universal joint 4 and a description thereof is omitted herein. The intersection of the first and second center axes 25 and 26 of the joint cross 30 of the second universal joint 6 is the joint center 31 of the second universal joint 6. The second center axis 26 extends in a direction orthogonal to the sheet surface of FIG. 1A.

The intermediate shaft 5 rotates about the rotation center axis, which is a line 32 linking the joint center 27 of the first universal joint 4 and the joint center 31 of the second universal joint 6. The intermediate shaft 5 also has a tube 33 and a shaft portion 34.

The shaft portion 34 is a shaft made of metal. The shaft portion 34 is fixed to the tube 33 at one end in the axial direction. The shaft portion 34 forms the second end portion 20 of the intermediate shaft 5 at the other end in the axial direction and is fixed while it is fit in the first yoke 28 of the second universal joint 6.

The tube 33 is formed of a metal member and of a hollow cylindrical shape. The cylindrical shape extends along the axial direction S of the intermediate shaft 5. The tube 33 has first and second end portions 35 and 36 with respect to the axial direction S of the intermediate shaft 5. The tube 33 also has an intermediate portion 37 interposed between the first end portion 35 and the second end portion 36. The first end portion 35 of the tube 33 forms the first end portion 19 of the intermediate shaft 5.

The tube 33 has a first circular cylinder 38, a second circular cylinder 39, and a hollow accordion portion 40. The first circular cylinder 38, the second circular cylinder 39, and the accordion portion 40 are formed of a single member as one unit.

The first and second circular cylinders 38 and 39 are disposed concentrically with each other about the line 32 described above. The first and second circular cylinders 38 and 39 have almost equal diameters. The first circular cylinder 38 is disposed at the first end portion 35 of the tube 33 and fixed to the second yoke 22 of the first universal joint 4. The second circular cylinder 39 is disposed at the second end portion 36 of the tube 33 and fixed to one end of the shaft portion 34 in the axial direction.

The accordion portion 40 is disposed at the intermediate portion 37 and of a cylindrical shape extending in the axial direction S1. The axial direction S1 of the accordion portion 40 coincides with the axial direction S of the intermediate shaft 5. The accordion portion 40 has plural crest portions 41 raised outward in the radial direction R of the accordion portion 40 and plural trough portion 42 recessed inward in the radial direction R of the accordion portion 40. The crest portions 41 and the trough portions 42 are aligned alternately in the axial direction S1 of the accordion portion 40. Each crest portion 41 has the apex 43 (shown only in part) and each trough portion 42 has the bottom 44 (shown only in part) on the outer peripheral surface of the accordion portion 40.

Hereinafter, descriptions will be given to a pair of the crest portion 41 and the trough portion 42 adjacent to each other, and it should be appreciated that the other pairs of the crest portion 41 and the trough portion 42 adjacent to each other are of the same configuration.

Referring to FIG. 1A and FIG. 1B, the depths D1 and D2 from the apex 43 of the crest portion 41 to the bottom 44 of the trough portion 42 correspond to a distance between the apex 43 of the crest portion 41 and the bottom 44 of the trough portion 42 with respect to the radial direction R of the accordion portion 40.

In this embodiment, the depth D1 (hereinafter, referred to as the first depth D1) in a part 45 of the accordion portion 40 (hereinafter, referred to simply as the part 45) with respect to the circumferential direction T of the accordion portion 40 is different from the depth D2 (hereinafter, referred to as the second depth D2) in the rest part 46 of the accordion portion 40 (hereinafter, referred to simply as the rest part 46) with respect to the circumferential direction T.

For example, it is configured in such a manner that all the values of the first depth D1 in the part 45 are made smaller than all the values of the second depth D2 in the rest part 46 (D1<D2). This configuration makes it difficult for the part 45 to contract relatively in the axial direction S1, whereas this configuration makes it easy for the rest part 46 to contract relatively in the axial direction S1. Consequently, the accordion portion 40 bends when absorbing a shock (see FIG. 4C).

Figure 2:
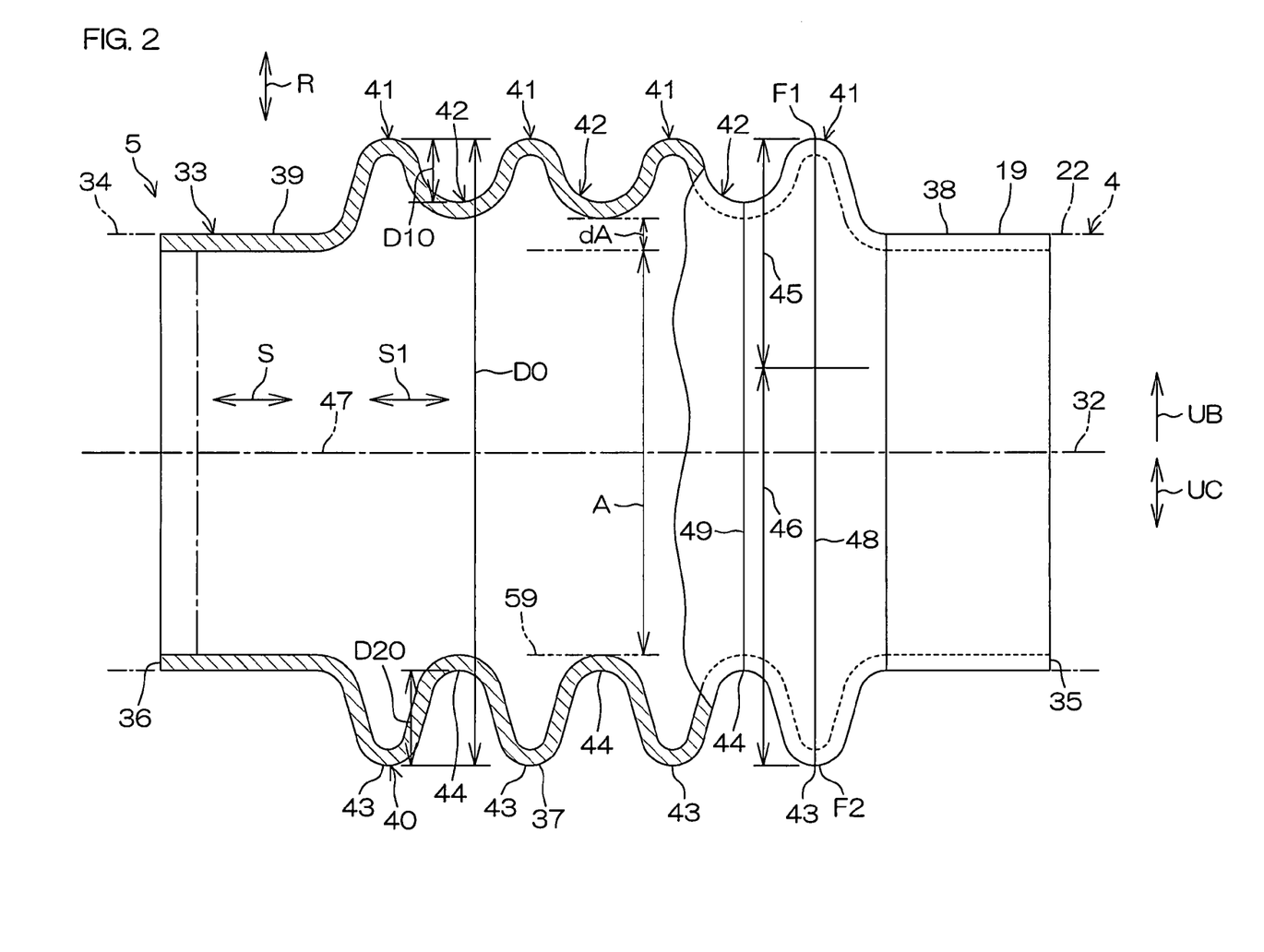
FIG. 2 is an enlarged view of FIG. 1A.
Figure 3:
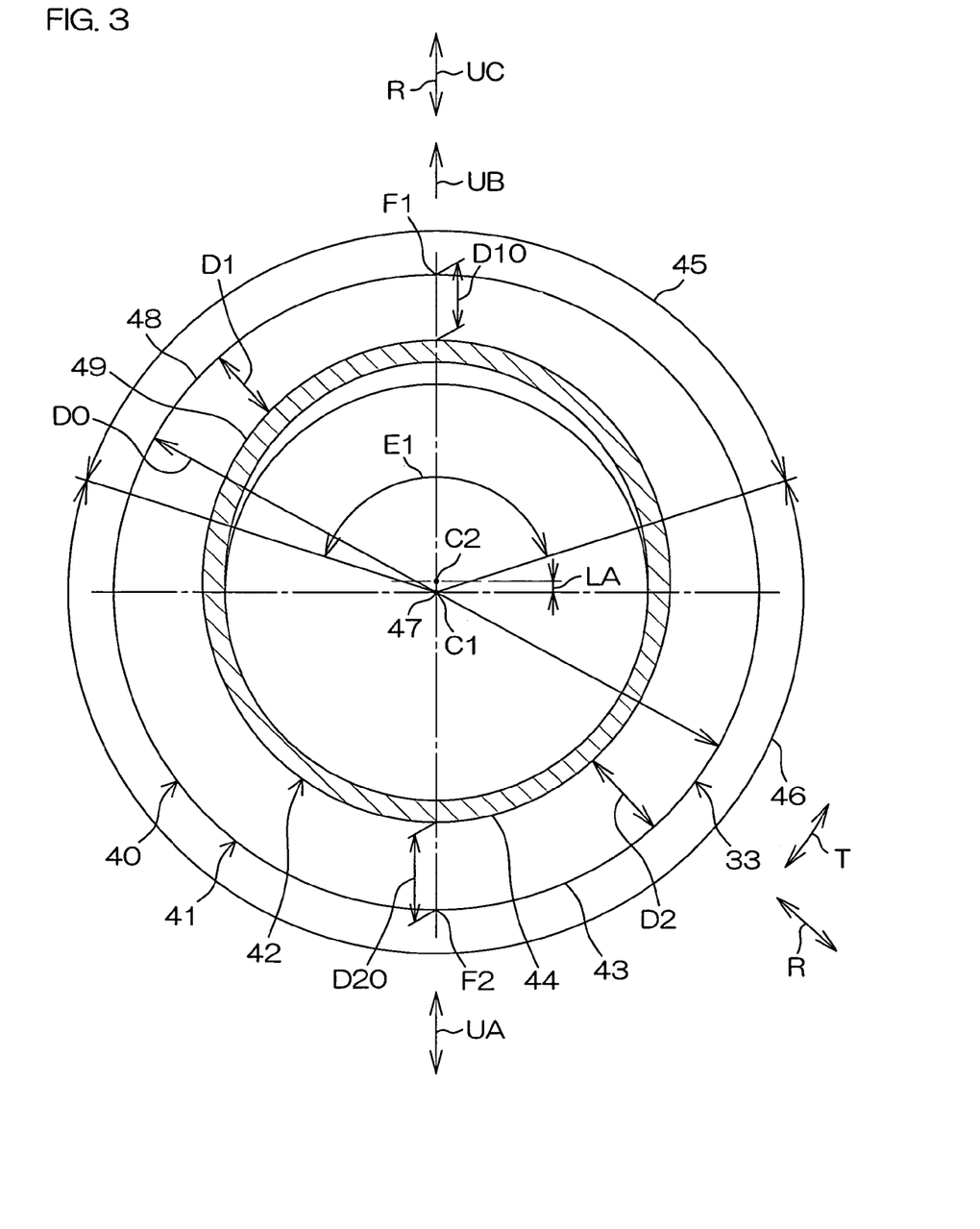
FIG. 3 is an enlarged view of FIG. 1B.

FIG. 2 is an enlarged view of FIG. 1A. FIG. 3 is an enlarged view of FIG. 1B. Referring to FIG. 2 and FIG. 3, the part 45 of the accordion portion 40 in the circumferential direction T extends continuously in a predetermined length along the circumferential direction T. When the accordion portion 40 is viewed along the axial direction S1, the center angle E1 corresponding to the part 45 takes a value that falls, for example, within the range of 90° to 270°.

The center angle E1 described above is centered on the center axis 47 of the first and second circular cylinders 38 and 39 of the tube 33. The first depth D1 takes the minimum value D10 at the center position F1 in the part 45 with respect to the circumferential direction T.

The rest part 46 of the accordion portion 40 in the circumferential direction T extends continuously in a predetermined length along the circumferential direction T. The second depth D2 takes the maximum value D20 at the center position F2 in the rest part 46 with respect to the circumferential direction T. The center position F1 and the center position F2 oppose each other. The opposing direction UC of the center position F1 and the center position F2 is, for example, along the radial direction R of the accordion portion 40.

Referring to FIG. 3, each of the depths D1 and D2 varies gradually as headed for the center position F2 in the rest part 46 from the center position F1 in the part 45.

Referring to FIG. 2 and FIG. 3, when the accordion portion 40 is viewed from the side corresponding to the radial direction R of the accordion portion 40, the ridge lines 48 on the apexes 43 of the plural crest portions 41 extend so as to cross the center axis 47 at right angles. Each crest portion 41 is continuous in the circumferential direction T of the accordion portion 40 and of a ring shape. When the accordion portion 40 is viewed along the axial direction S1, the ridge line 48 on the apex 43 of each crest portion 41 forms a circular shape having a diameter D0. The circular shape described above is disposed concentrically with the first and second circular cylinders 38 and 39.

Referring to FIG. 2 and FIG. 3, when the accordion portion 40 is viewed from the side corresponding to the radial direction R of the accordion portion 40, the trough lines 49 at the bottoms 44 of the plural trough portions 42 extend so as to cross the center axis 47 at right angles.

Referring to FIG. 3, each trough portion 42 is continuous in the circumferential direction T of the accordion portion 40 and of a ring shape. In a cross section of the accordion portion 40 orthogonal to the center axis 47, the trough line 49 at the bottom 44 of each trough portion 42 forms an elliptical shape.

In a cross section of the accordion portion 40 orthogonal to the center axis 47, the center C2 of the ellipse formed by each trough line 49 is disposed so as to be offset from the center C1 (present on the center axis 47 in this embodiment) of the circle formed by the ridge line 48 of the crest portion 41 by a predetermined distance LA in a predetermined offset direction UB. The offset direction UB is along the major axis direction UA of the elliptical shape. The offset direction UB is along the opposing direction UC described above in which the part 45 and the rest part 46 oppose each other.

Referring to FIG. 2 and FIG. 3, the ridge lines 48 on the apexes 43 of the plural crest portions 41 are all disposed in the same positional relation with respect to the center axis 47. Also, the trough lines 49 at the bottoms 44 of the plural trough portions 42 are all disposed in the same positional relation with respect to the center axis 47.

Figure 4A:
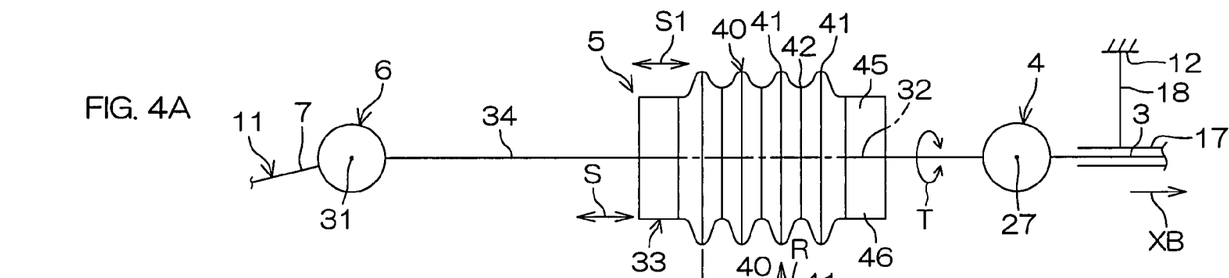
FIG. 4A is a schematic view of the shock absorbing steering device for vehicle before absorbing a shock.
Figures 4B, 4C:
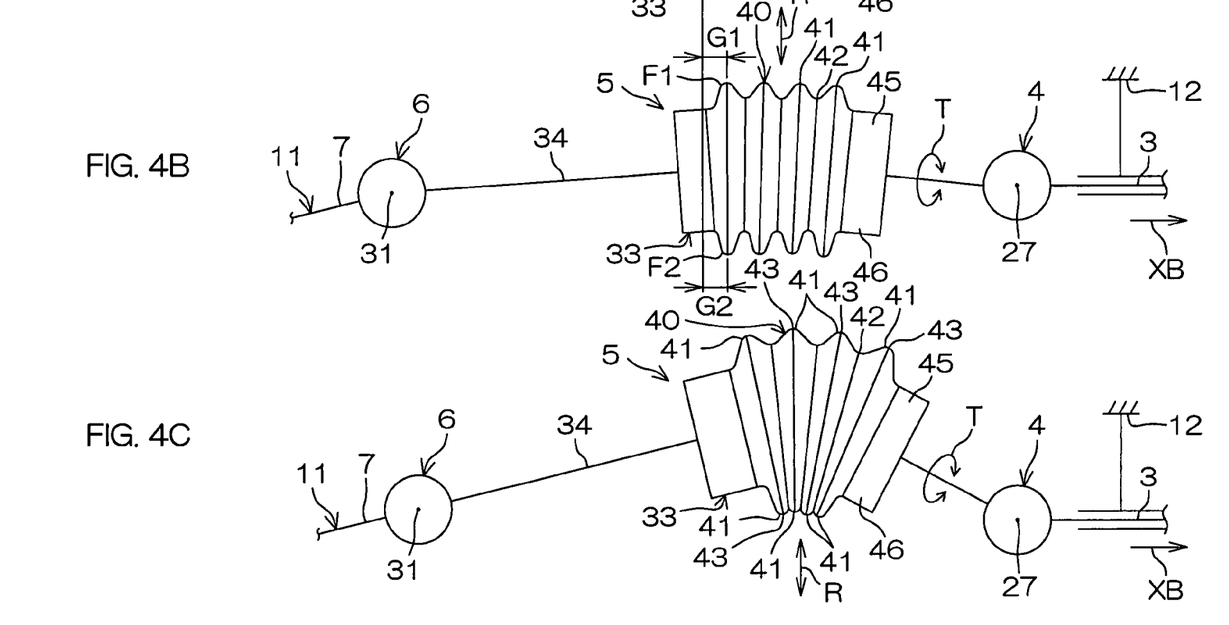
FIG. 4B is a schematic view of the shock absorbing steering device for vehicle at the beginning of absorbing a shock.
FIG. 4C is a schematic view of the shock absorbing steering device for vehicle in the middle of the process of absorbing a shock.

FIG. 4A, FIG. 4B, and FIG. 4C are schematic views of the shock absorbing steering device 1 for vehicle of FIG. 1A. FIG. 4A shows a normal state before a shock is absorbed. FIG. 4B shows a state at the beginning of absorption of a shock. FIG. 4C shows a state where the intermediate shaft 5 has contracted from a state in FIG. 4B.

Referring to FIG. 4A and FIG. 4B, upon a crash of the vehicle, the steering gear 11 moves with respect to the vehicle body 12 toward the back of the vehicle, XB. In association with this movement, the accordion portion 40 starts to contrast upon receipt of an impulsive force in the axial direction S of the intermediate shaft 5.

Referring to FIG. 4B, in a state where the accordion portion 40 has contracted slightly, a contraction amount G1 in the part 45 of the accordion portion 40 in the circumferential direction T becomes relatively small, whereas a contraction amount G2 in the rest part 46 in the circumferential direction T becomes relatively large. This consequently causes the accordion portion 40 to sag in the radial direction R of the accordion portion 40. In FIG. 4B, the contraction amount G1 at the center position F1 of the part 45 and the contraction amount G2 at the center portion F2 of the rest part 46 are shown.

Referring to FIG. 4C, when a sagging amount in the radial direction R is increased, the crest portions 41 in the rest part 46 start to function as the supporting points for bending while coming into contact with one another. Accordingly, intervals among the apexes 43 of the crest portions 41 in the part 45 become larger. Consequently, the entire accordion portion 40 bends while undergoing plastic deformation so that the part 45 falls on the outer side of the bending. A shock absorbing stroke amount can be thus increased.

Referring to FIG. 1A and FIG. 1B, the shock absorbing steering device 1 for vehicle of this embodiment includes the intermediate shaft 5 having the first and second end portions 19 and 20, the first universal joint 4 that couples the first end portion 19 of the intermediate shaft 5 and the steering shaft 3, and the second universal joint 6 that couples the second end portion 20 of the intermediate shaft 5 and the pinion shaft 7 as the input shaft of the steering gear 11. The intermediate shaft 5 includes the hollow accordion portion 40 having the crest portions 41 and the trough portions 42 alternately.

Across the entire region of the accordion portion 40 in the axial direction S1, the first depth D1 from the apex 43 of the crest portion 41 to the bottom 44 of the trough portion 42 in the part 45 of the accordion portion 40 in the circumferential direction T is different from the second depth D2 from the apex 43 of the crest portion 41 to the bottom 44 of the trough portion 42 in the rest portion 46 in the circumferential direction T.

In this embodiment, for example, because a contraction amount in the part 45 of the accordion portion 40 in the circumferential direction T is different from a contraction amount in the rest part 46 upon a crash of the vehicle, the accordion portion 40 bends while it is contracting. The intermediate shaft 5 therefore contracts owing to the accordion portion 40 that contracts while it is bending as described above. Hence, in comparison with the conventional case where the intermediate shaft directly contracts without causing the accordion portion to bend, it is possible to achieve a large shock absorbing stroke amount in this embodiment. In other words, it is possible to reduce the size of the intermediate shaft 5, and hence the size of the shock absorbing steering device 1 for vehicle while increasing a shock absorbing stroke amount.

In this embodiment, the value of a ratio (SS/ZA) of a shock absorbing stroke amount SS (not shown) to a joint center distance ZA can be increased in comparison with the case of using the conventional intermediate shaft that contracts without bending. Hence, the degree of freedom in setting the joint center distance ZA can be enhanced under the condition that a predetermined shock absorbing stroke amount is ensured. Further, a degree of freedom in design when installing the shock absorbing steering device 1 for vehicle in the vehicle body 12 (so-called the degree of freedom in packaging) can be enhanced.

The joint center distance referred to herein is the distance between the joint centers (corresponding to the joint centers 27 and 31 in this embodiment) of a pair of universal joints at the both ends of the intermediate shaft in a normal state. The shock absorbing stroke amount referred to herein is the maximum value of an achievable shock absorbing stroke amount when absorbing a shock. The conventional intermediate shaft described above is an intermediate shaft having a pair of shaft members fit in each other and configured so as contract without bending owing to the shaft members that slide relatively with respect to each other upon a crash.

Referring to FIG. 3, by changing the distance LA from the center C1 of the apex 43 of the crest portion 41 of the accordion portion 40 and the center C2 of the bottom 44 of the trough portion 42 when viewed along the axial direction S1, it is possible to adjust a difference between the first depth D1 in the part 45 and the second depth D2 in the rest part 46. It is thus possible to adjust the magnitude of a resistance force against the contraction of the intermediate shaft 5 when absorbing a shock, and further, a degree of freedom in adjusting a shock absorbing load can be enhanced.

Referring to FIG. 3, in this embodiment, the diameter D0 of the circle formed by the ridge line 48 of the crest portion 41 is constant. The first depth D1 from the apex 43 of the crest portion 41 to the bottom 44 of the trough portion 42 is made relatively shallow in the part 45 in the circumferential direction T.

In this case, because the diameter D0 of the circle formed by the ridge line 48 of the crest portion 41 is made constant, the accordion portion 40 can be readily formed. In addition, because the part 45 of the accordion portion 40 in the circumferential direction T does not contract easily upon a crash of the vehicle in comparison with the rest part 46, the accordion portion 40 bends with the part 45 in the circumferential direction T falling on the outer side of the bending.

Referring to FIG. 1A, in this embodiment, the intermediate shaft 5 includes the tube 33 as a part thereof. The tube 33 includes the first end portion 35, the second end portion 36, and the intermediate portion 37 interposed between the first end portion 35 and the second end portion 36. The first and second circular cylinders 38 and 39 concentric with the line 32 linking the joint centers 27 and 31 of the first and second universal joints 4 and 6, respectively, are provided to the first end portion 35 and the second end portion 36, respectively. The accordion portion 40 is provided to the intermediate portion 37.

In this case, the tube 33 with the accordion portion 40 can be manufactured easily as a part of the intermediate shaft 5. Because the first and second circular cylinders 38 and 39 are concentric about the line 32 described above, the first and second circular cycles 38 and 39 can be readily connected, respectively, to the second yoke 22 of the first universal joint 4 and the shaft portion 34 as the corresponding members. Also, for example, in a case where the first and second circular cylinders 38 and 39 are connected to the corresponding members described above by means of welding, it is possible to improve the welding quality.

Referring to FIG. 1A and FIG. 1B, in this embodiment, the first and second depths D1 and D2 that vary with the position on the accordion portion 40 in the circumferential direction T are set. Consequently, when the accordion portion 40 is compressed in the axial direction S of the intermediate shaft 5, a contraction amount of the accordion portion 40 in the axial direction S1 becomes uneven with respect to the position on the accordion portion 40 in the circumferential direction T. This configuration therefore makes the entire accordion portion 40 to bend more readily. For example, the shock absorbing load can be lessened. Further, it becomes possible to achieve a large shock absorbing stroke amount quickly in a reliable manner.

On the contrary, because the depth from the bottom of the trough portion to the apex of the crest portion of the conventional accordion portion is made constant regardless of the position in the circumferential direction, a contraction amount of the accordion portion is uniform all along the circumference. This configuration therefore makes it difficult for the entire accordion portion to bend.

Also, in this embodiment, the accordion portion 40 is formed by increasing the diameter of an element tube when manufacturing the tube 33. In this instance, in order to vary the first and second depths D1 and D2 described above with respect to the position in the circumferential direction T, the diameter of the element tube is increased for both the crest portions 41 and the trough portions 42. Hence, contrary to a case where the diameter of the element tube is increased for the crest portions alone, in this embodiment, it is possible to ensure a sufficient difference between the first depth D1 in the part 45 and the second depth D2 in the rest part 46 under the restriction that the tube expansion ratio will not exceed the tolerance.

The tube expansion ratio referred to herein is a value defined as a ratio, (A+dA)/A, where A is the diameter of the tube element in a given cross section and (A+dA) is the corresponding product diameter after the diameter expansion. Defective molding occurs more frequently as the value of the tube expansion ratio increases. The tolerance described above is the maximum value of the tube expansion ratio at which the tube can be expanded without causing defective molding. In FIG. 2, the inner periphery 59 of the element tube corresponding to the tube 33 is indicated by a chain double-dashed line.

This embodiment can be modified as follows. Hereinafter, differences from the embodiment above will be chiefly described. Because the other configurations are the same as those of the embodiment above, a description thereof is omitted herein.

Figure 5:
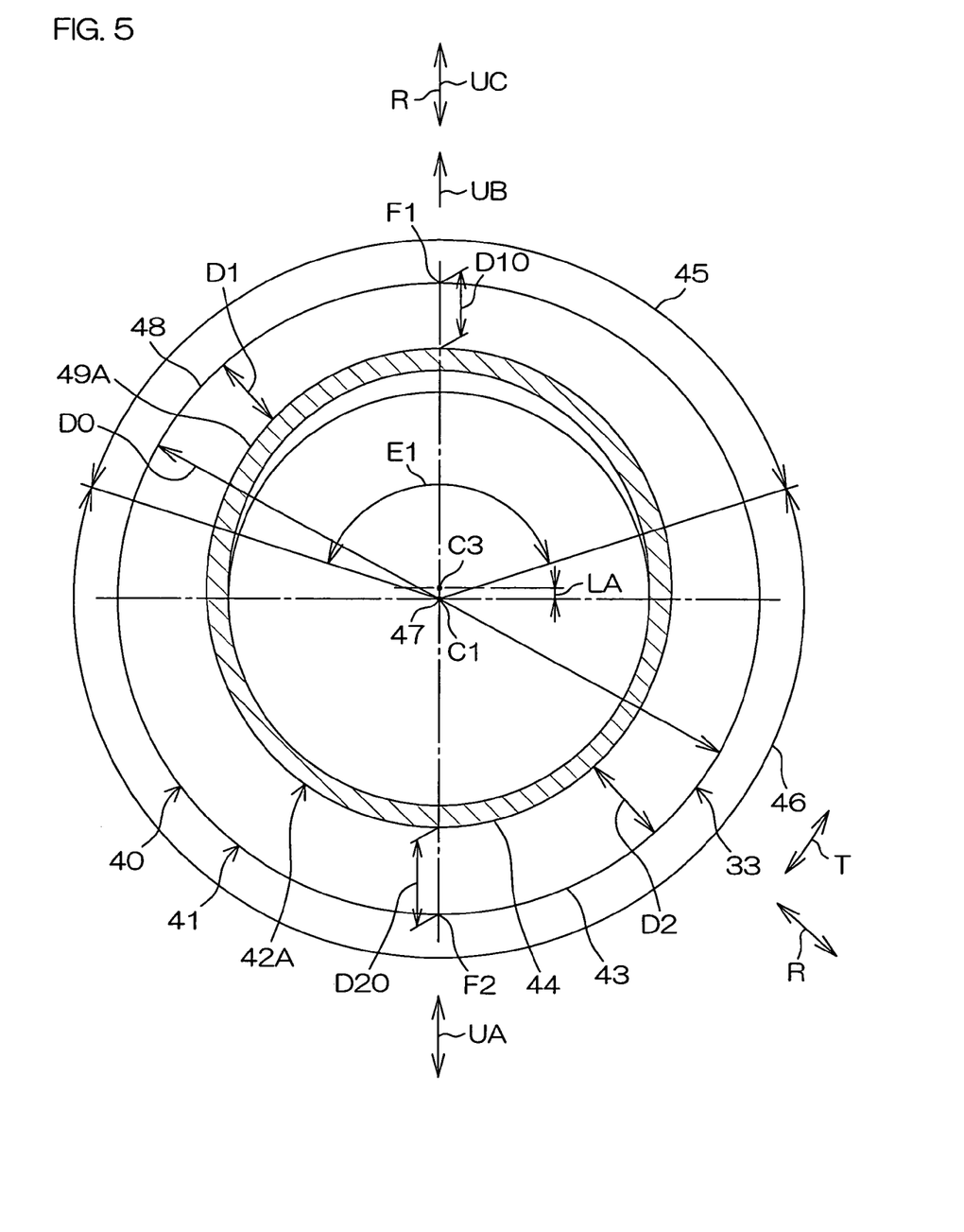
FIG. 5 is a schematic cross section of an accordion portion in a shock absorbing steering device for vehicle according to another embodiment of the invention.

For example, when the accordion portion 40 is viewed along the axial direction S1, as is shown in FIG. 5, the shape formed by a trough line 49A of a trough portion 42A may be a circular shape. The center C3 of the circle formed by the trough line 49A is disposed so as to be offset from the center C1 of the shape formed by the ridge line 48 on the apex 43 of the crest portion 41.

Figure 6:
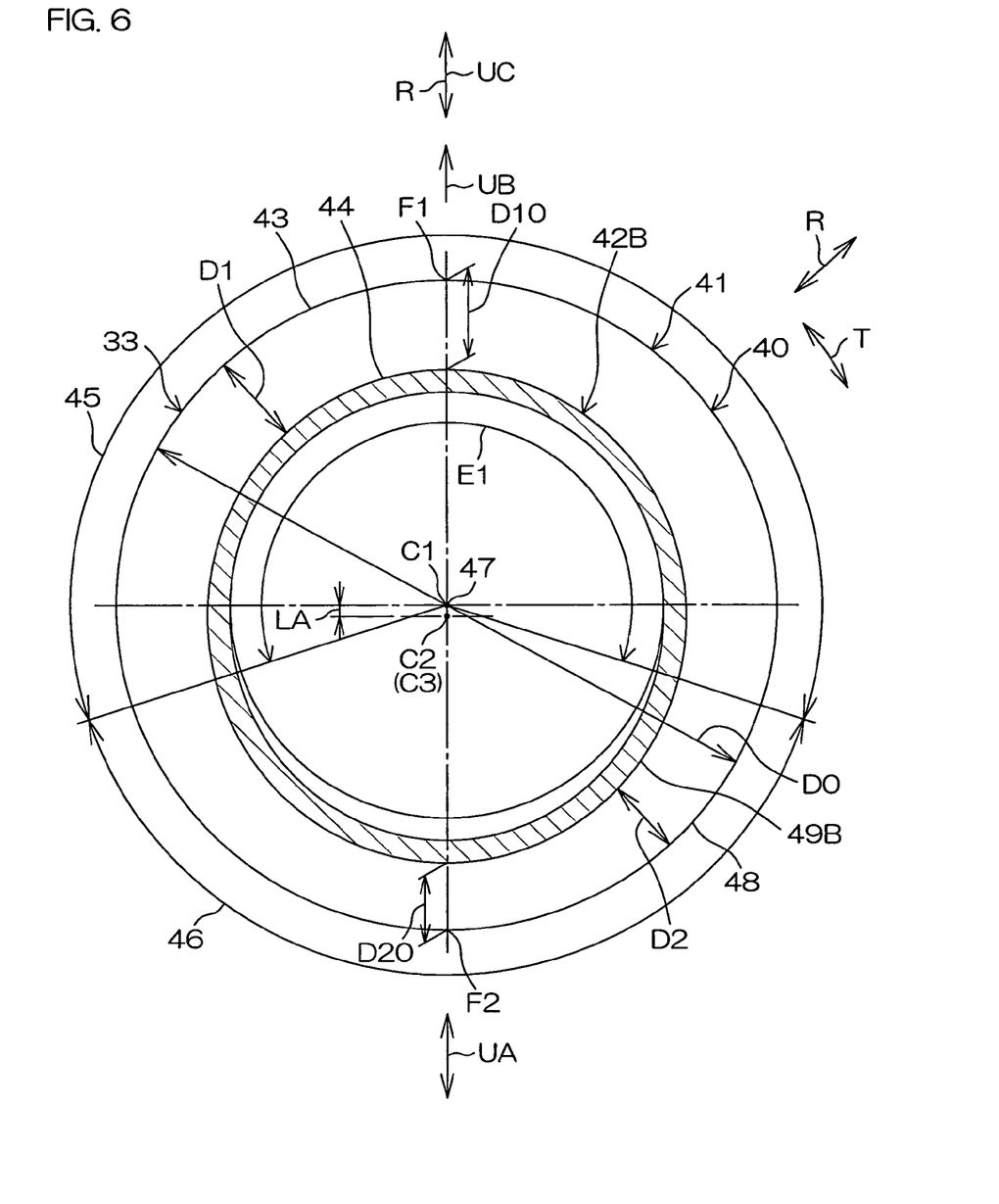
FIG. 6 is a schematic cross section of an accordion portion in a shock absorbing steering device for vehicle according to still another embodiment of the invention.

Also, when the accordion portion 40 is viewed along the axial direction S1, as is shown in FIG. 6, the first depth D1 in the part 45 may be made larger than the second depth D2 in the rest part 46 (D1>D2). In this case, the direction in which the center C2 or C3 of the ellipse or the circle formed by a trough line 49B of a trough portion 42B is offset from the center C1 is opposite to a direction in which the center C2 or C3 of the ellipse or the circle of formed by the trough line 49 or 49A of the trough portion 42 or 42A is offset from the center C1 in embodiments shown in FIG. 3 and FIG. 6.

In short, it is sufficient that the first depth D1 in the part 45 and the second depth D2 in the rest part 46 are different from each other.

Figure 7:
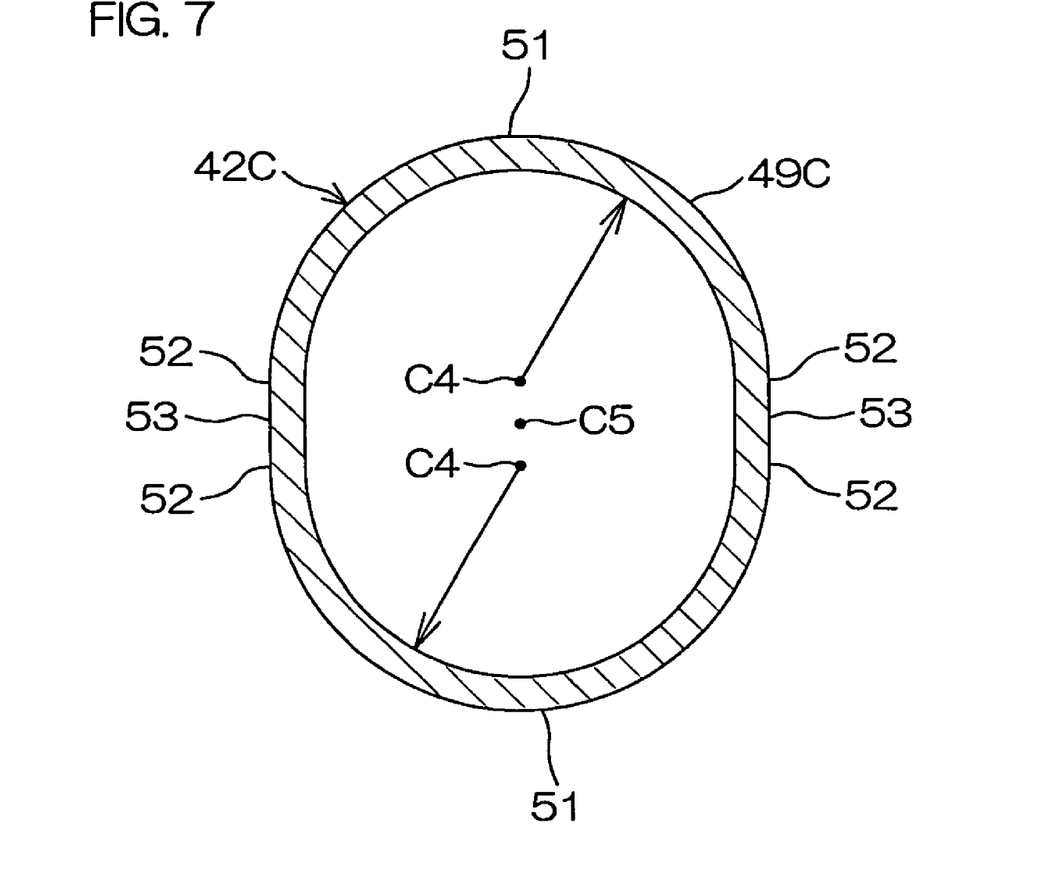
FIG. 7 is a schematic cross section of a trough portion of an accordion portion in still another embodiment of the invention.

Also, the shape formed by the rough line 49 may be an oblong shape other than the elliptical shape described above. For example, it may be an oval shape. Also, as is shown in FIG. 7, a trough line 49C of a trough portion 42C may be of a shape including a pair of semicircular arcs 51 and a pair of line segments 53 parallel to each other that connect corresponding end portions 52 of a pair of the semicircular arcs 51. The centers C4 of a pair of the semicircular arcs 51 are spaced apart by a predetermined distance, and the center C5 of the shape formed by the trough line 49C is at the center position between the centers C4 of a pair of the semicircular arcs 51.

In addition, the relation that the first depth D1 in the part 45 and the second depth D2 in the rest part 46 are different from each other may be established across the entire region of the accordion portion 40 in the axial direction S1 or only in a partial region of the accordion portion 40 in the axial direction S1.

While the invention has been described in detail by way of concrete embodiments, it should be appreciated that modifications, alterations, and equivalents readily occur to those skilled in the art who understand the contents of the description above. The scope of the invention, therefore, is limited solely by the scope of the appended claims and equivalents thereof.

This application is based upon and claims the benefit of priority from the prior Japanese Patent Application No. 2007-172279 filed with the Japanese Patent Office on Jun. 29, 2007, the entire contents of which are incorporated herein by reference.

What is claimed is:

1. A shock absorbing steering device for a vehicle, comprising:
    a steering shaft coupled to a steering member;
    a steering gear for turning a steerable wheel; and
    an intermediate shaft interposed between the steering shaft and the steering gear to couple the steering shaft and the steering gear, the intermediate shaft including a hollow accordion portion allowed to undergo plastic deformation, the accordion portion having plural pairs of crest portions and trough portions alternately disposed in an axial direction of the accordion portion;
    wherein in at least in a part of the accordion portion in the axial direction, each trough portion has first and second different depths in a circumferential direction, as measured from an apex of an adjacent crest portion to a bottom of the trough portion, with the first depth being in a first part of each of the trough portions in a circumferential direction, and the second depth being in a second part of each of the trough portions in the circumferential direction.

2. The shock absorbing steering device for the vehicle according to claim 1, wherein:
    when the accordion portion is viewed along the axial direction, a shape formed by ridge lines of the crest portions is a circle.

3. The shock absorbing steering device for the vehicle according to claim 2, wherein:
    when the accordion portion is viewed along the axial direction, a shape formed by trough lines as the bottoms of the trough portions is an ellipse; and
    a center of the ellipse is offset from a center of the circle formed by the ridge lines of the crest portions.

4. The shock absorbing steering device for the vehicle according to claim 2, wherein:
    when the accordion portion is viewed along the axial direction, a shape formed by trough lines as the bottoms of the trough portions is a circle; and
    a center of the circle formed by the trough lines is offset from a center of the circle formed by the ridge lines of the crest portions.

5. The shock absorbing steering device for the vehicle according to claim 2, wherein:
    when the accordion portion is viewed along the axial direction, a shape formed by trough lines as the bottoms of the trough portions includes a pair of semicircular arcs and a pair of line segments parallel to each other;
    centers of a pair of the semicircular arcs are spaced apart from each other by a predetermined distance;
    the pair of line segments connects corresponding end portions of the pair of semicircular arcs; and
    a center of the shape formed by the trough lines is disposed at a center position between the centers of the pair of semicircular arcs.

6. The shock absorbing steering device for the vehicle according to claim 1, wherein:
    the first depth is made shallower than the second depth.

7. The shock absorbing steering device for the vehicle according to claim 1, wherein:
    the first depth is made deeper than the second depth.

8. The shock absorbing steering device for the vehicle according to claim 1, further comprising:
    a first universal joint that couples the intermediate shaft and the steering shaft;
    a second universal joint that couples the intermediate shaft and an input member of the steering gear;
    wherein the intermediate shaft includes a tube having a first end portion, a second end portion, and an intermediate portion interposed between the first end portion and the second end portion,
    the accordion portion is provided on the intermediate portion,
    a first circular cylinder provided on the first end portion,
    a second circular cylinder provided on the second end portion, and
    centers of the first circular cylinder and the second circular cylinder coincide with a line linking joint centers of the first universal joint and the second universal joint.

* * * * *